United States Patent
Schmalzhofer

(10) Patent No.: US 6,960,045 B2
(45) Date of Patent: Nov. 1, 2005

(54) CONNECTOR FOR PROFILES

(75) Inventor: Rainer Schmalzhofer, Eppingen-Kleingartach (DE)

(73) Assignee: FMS Forder-und Montage-Systeme Schmalzhofer GmbH, Eppingen-Muhlbach (DE)

( * ) Notice: Subject to any disclaimer, the term of this patent is extended or adjusted under 35 U.S.C. 154(b) by 0 days.

(21) Appl. No.: 10/459,029

(22) Filed: Jun. 10, 2003

(65) Prior Publication Data

US 2003/0219307 A1 Nov. 27, 2003

Related U.S. Application Data

(63) Continuation of application No. PCT/DE01/04365, filed on Nov. 20, 2001.

(30) Foreign Application Priority Data

Dec. 12, 2000 (DE) .......................... 200 20 996 U

(51) Int. Cl.[7] ................................................ F16B 9/00
(52) U.S. Cl. ..................... 403/252; 403/188; 403/255; 403/264; 403/381; 403/383
(58) Field of Search ................................ 403/187, 188, 403/248, 255–261, 263, 264, 380–383, 12, 403/252; 52/222, 655.1

(56) References Cited

U.S. PATENT DOCUMENTS

| | | |
|---|---|---|
| 4,641,983 A | 2/1987 | Strassle |
| 4,893,959 A | 1/1990 | Offenbroich |
| 5,192,145 A * | 3/1993 | Rixen et al. ................. 403/255 |
| 5,794,897 A * | 8/1998 | Jobin et al. .................. 403/391 |

FOREIGN PATENT DOCUMENTS

| | | |
|---|---|---|
| CH | 536 977 A1 | 6/1973 |
| CH | 645 957 A1 | 10/1984 |
| DE | 27 32 887 A1 | 2/1979 |
| DE | 36 03 393 A1 | 8/1987 |
| DE | 87 12 119.0 A1 | 12/1987 |
| DE | 38 19 609 A1 | 12/1989 |
| DE | 42 44 603 A1 | 7/1994 |
| DE | 198 42 896 A1 | 4/2000 |
| EP | 0 311 834 B1 | 4/1989 |
| EP | 0 666 425 A2 | 8/1995 |
| WO | WO-84/01801 A1 | 5/1984 |

\* cited by examiner

*Primary Examiner*—Daniel P. Stodola
*Assistant Examiner*—Victor MacArthur
(74) *Attorney, Agent, or Firm*—Darby & Darby

(57) ABSTRACT

A connector device for connecting a first profile to the end side of a second profile with a central recess having a connector bolt with a shank and an end contour. When the connector is installed, the end contour engages with a clamping action behind a recess, in particular a groove, in the first profile. Here, the connector bolt is adjoined, on the end side which is located opposite the end contour, by an extension element with an end stop, and the extension element is slidingly mounted in a bushing. In addition, an elastic element is provided between the bushing and the connector bolt. This elastic element acts directly or indirectly on the sliding bushing and the connector bolt.

21 Claims, 5 Drawing Sheets

CONNECTOR FOR PROFILES

This is a continuation of International Patent Application No. PCT/DE01/04365, filed Nov. 20, 2001; and which claims priority of German Patent Application No. 200 20 996.5, filed Dec. 12, 2000. The International Application was published in German on Jun. 20, 2002 as WO 02/48555 A1 under PCT Article 21(2).

TECHNICAL FIELD

The present invention relates to a connector device for connecting a first profile to the end side of a second profile with a central recess, having a connector bolt with a shank and an end contour, it being possible for the shank of the connector bolt to be arranged and fixed in the central recess of the second profile, and the end contour, in the installed state of the connector device, engaging with clamping action behind a recess, in particular a groove, in the first profile.

Such connector devices are preferably used for connecting aluminum profiles, the first profile having at least one groove on the outside and the second profile being connected, from its end side, to the first profile by means of the connector device.

PRIOR ART

EP-0 311 834 B1 discloses a connector device of the type mentioned in the introduction. The profiles are clamped via a connector bolt with a conical depression in which there engages a conical threaded pin which is screwed into a clamping sleeve inserted in the second profile.

In the case of a further known connector device, for the purpose of improving handling during installation, a spring is inserted between the sleeve and the connector head and pushes the connector bolt outward, this producing the necessary amount of joining play for inserting the connector bolt into the first profile.

The disadvantage of this solution resides in the weakening of the connector bolt, which has to be reduced in order to accommodate the spring, which results in a reduction in the clamping surface area between the conical depression and threaded pin. Furthermore, such a connector device is accompanied by relatively high outlay during installation and/or the introduction of the spring with the bolt into the clamping sleeve.

In the case of the connector device disclosed in DE 38 19 609 A1, the spring is positioned between the connector bolt and a stopper which is to be introduced into the profile bore. Here too, relatively high outlay is necessary for introducing the stopper by means of an auxiliary installation tool. It is also the case that the spring has to be inserted separately into the bore, and it is only then that the bolt can be guided into the sleeve and secured by means of the threaded pin.

DESCRIPTION OF THE INVENTION

Taking the abovementioned prior art as the departure point, the object or the technical problem on which the present invention is based is to specify a connector device which is easy to install and to handle, ensures the necessary amount of joining play for inserting the connector bolt and, overall, allows a permanently reliable connection between the two profiles.

The connector device according to the invention is provided by the features of independent claim 1. Advantageous configurations and developments form the subject matter of the dependent claims.

Accordingly, the connector device according to the invention is distinguished in that the connector bolt is adjoined, on the end side which is located opposite the end contour, by an extension element with an end stop, the extension element is mounted with sliding action in a bushing which can be fixed with clamping action in the central recess of the second profile, and provided between the bushing and the connector bolt is an elastic element which acts directly or indirectly on the sliding bushing and the connector bolt.

The spring element is thus arranged following the connector bolt, with the result that the entire cross section of the connector bolt is available for bracing the latter and a large abutment surface area is thus available for a clamping screw.

A particularly preferred configuration, which ensures cost-effective production, is distinguished in that the elastic element is designed as a spring element, in particular as a helical spring which encloses the extension element in certain regions.

According to an alternative configuration, it is possible for the extension element to be formed integrally with the connector bolt or for the extension element, the connector bolt, the bushing and the elastic element to form a single manageable unit.

A particularly preferred configuration is distinguished in that the extension element is designed as a drive-in element, in particular a notched nail, drive-in pin or knurled pin.

As an alternative, it possible for the extension element to be formed in a releasable manner, in particular via a latching element on the extension element and a corresponding mating latching element on the shank of the connector bolt.

The extension element may be designed as plastic injection molding or a part which is machined by an automatic lathe.

An advantageous configuration which ensures reliable seating of the bushing within the central recess is distinguished in that the outer contour of the bushing which butts against the wall of the central recess of the second profile is of double-lipped design.

As an alternative, the outer contour of the bushing may also be of semicircular design with convex curvature.

In respect of straightforward production, it is advantageous for the bushing to have a sliding flanged bushing within it.

A configuration which is advantageous particularly in respect of cost-effective production is distinguished in that the the shank of the extension unit has a stop for the bushing. The bushing is preferably provided with a radial slit which, in conjunction with a spring ring positioned in the wall, ensures reliable fixing of the bushing within the central recess during the installation process.

In order to increase the strength of the connection as a whole, a particularly preferred development is distinguished in that the head contour of the connector bolt is designed as a head which has a circular cross section and of which the encircling end border which is oriented toward the shank has an annular cutting edge.

In order to ensure reliable transmission of the necessary connection forces, a particularly advantageous configuration is distinguished in that there is provided a connector sleeve which has an internal thread and can be introduced into a bore which is provided perpendicularly to the longitudinal direction of the second profile and has a bolt recess such that the connector device can be pushed through the bolt recess when the connector sleeve has been inserted into the bore, and a threaded pin with corresponding external thread can be screwed into the internal thread of said connector sleeve, it being possible for the threaded pin, at least in certain regions, to be screwed in a form-fitting manner, by way of its end region, into a contour provided on the shank of the connector bolt, as a result of which the end contour of the connector bolt is clamped in the recess of the first profile.

The connector device according to the invention avoids all of the disadvantages known in the prior art. The connector bolt is provided with a spring element which is arranged following the conical depression of the connector shank. This means that the connector bolt is not weakened in any way in the functioning and clamping region. In contrast to the known configurations, rather than being a loose part, the spring element is an integral constituent part of the connector device, and is supported between a shoulder on the connector bolt and on the bushing. The bushing has a sliding sleeve in which the extension element is guided with sliding action, the bushing being designed, in relation to the inner wall of the central recess, as a seal-like retaining element which, when the connector bolt is introduced, wedges itself in a dimensionally flexible manner against the inner wall of the central recess. During installation, the spring element is thus brought into effect, and the latter pushes the connector bolt outward, as a result of which the necessary amount of joining play is achieved. The clamping action of the bushing does away with the prior-art necessity of the connecting parts being secured via a conical screw during installation, with the result that this step does not form part of the installation process and the clamping screw is only actuated when the profiles are in the joining position.

A configuration which is particularly preferred in respect of easy installation is distinguished in that the geometry of the arrangement and/or the length of the extension element, of the connector bolt with end contour and the elastic element are coordinated with one another such that, once the bushing has been pushed with clamping action into the central recess of the second profile, the end contour projects beyond the end side of the second profile by an extent which corresponds to the insertion-groove depth of the first profile.

A particular further development which allows quick and easy installation is distinguished in that the end contour of the connector bolt has at least one evenly flattened region which, with the end contour introduced into the groove of the first profile, butts against the longitudinal groove wall and thus forms a rotation-prevention means, the end contour, in a preferred development, having two mutually opposite flattened planar regions.

Further embodiments and advantages of the invention can be gathered from the rest of the features given in the claims and from the exemplary embodiments specified hereinbelow. The features of the claims may be combined with one another in any desired manner provided they are not obviously mutually exclusive.

BRIEF DESCRIPTION OF THE DRAWING

The invention and advantageous embodiments and developments of the same are explained and described in more detail hereinbelow with reference to the examples illustrated in the drawing. The features which can be gathered from the description and the drawing can be used, according to the invention, on their own or together in any desired combination. In the drawing.

METHODS OF IMPLEMENTING THE INVENTION

Figure 1:
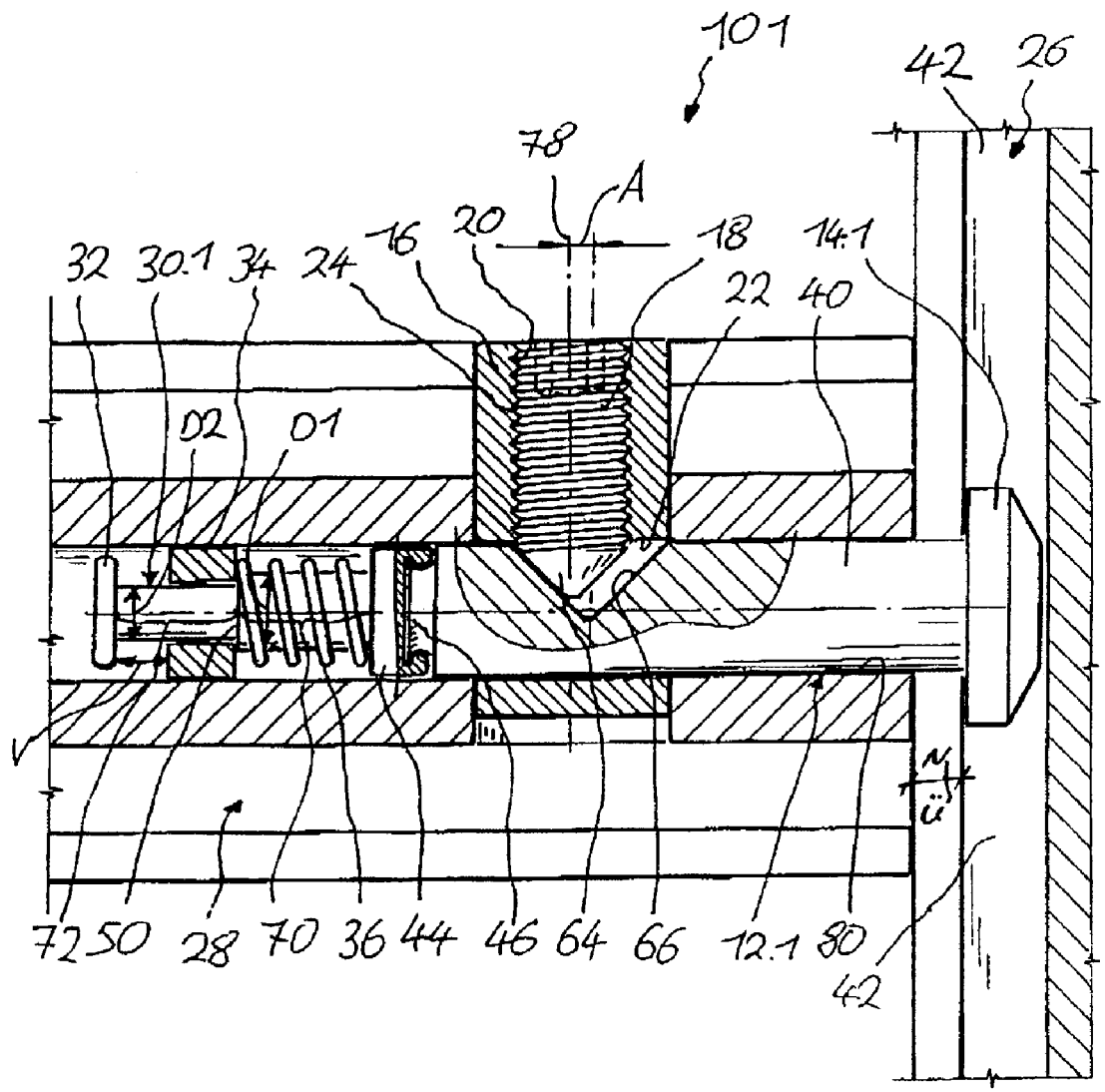
FIG. 1 shows a schematic sectional illustration through the connecting region of two profiles with a first variant of a connector device with releasably arranged extension element with bushing and spring element.
Figure 2:
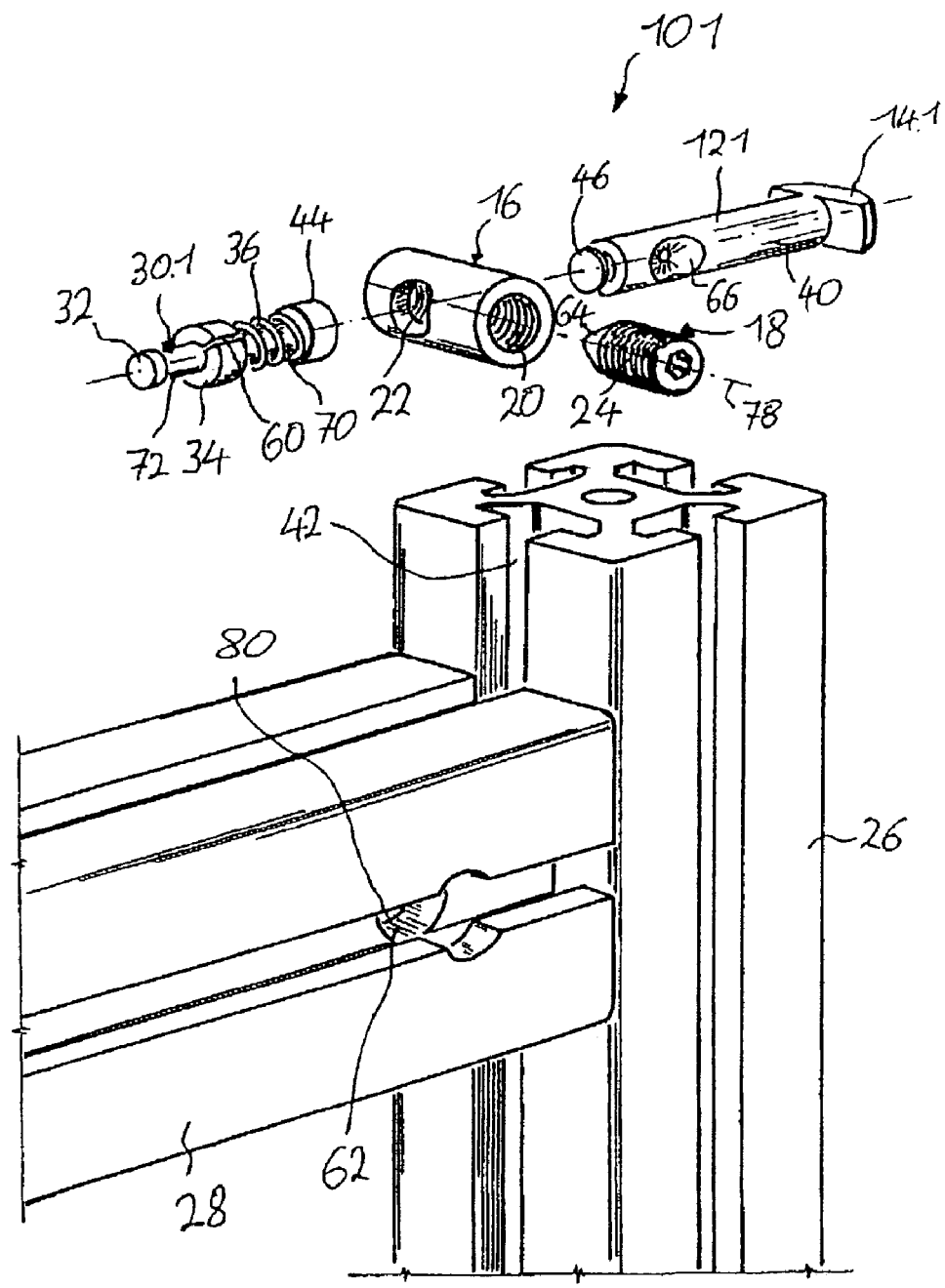
FIG. 2 shows a schematic illustration of the connecting region according to FIG. 1 in respective exploded form.

FIGS. 1 and 2 illustrate a first exemplary embodiment of a connector device 10.1 for connecting a first profile 26 to a second profile 28. The two profiles 26, 28 are extruded aluminum profiles which have a groove 42 on each outer side and, in addition, have a continuous central recess 80 in their cross-sectional center. The second profile 28 has its end region fastened on the first profile 26. For this purpose, the connector device 10.1 is introduced into the central recess 80 of the second profile 28.

The connector device 10.1 has a connector bolt 12.1 with a cylindrical shank 40, a head contour 14.1, which is designed as a hammer head, being integrally formed on the front end region of said shank. The head contour 14.1 here is configured such that it can be introduced into the groove 42 such that it engages behind the same. A mating latching element 46 with an encircling protrusion is integrally formed on that end region of the shank 40 which is located opposite the head contour 14.1. Furthermore, the shank 40 also has a conical recess 66 (depression).

Latched to the mating latching element 46 is a corresponding latching element 44, which is a constituent part of a stepwise-cylindrical extension element 30.1 having a first region 70 with a diameter D1 and an adjoining, second region 72 with a diameter D2.

An end stop 32 is integrally formed on that end region of the extension element 30.1 which is located opposite the latching element 44. A bushing 34 is arranged with sliding action on the second region 72, the external diameter of said bushing being designed such that the bushing 34 can be arranged with clamping action in the central recess 80 of the second profile 28. Arranged between the bushing 34 and the latching element 44, in the first region 70, is a spring element 36 which encloses the first region 70, namely a helical spring which is supported, on the one hand, against the latching element 44 and, on the other hand, against the bushing 34. Since the diameter D1 of the first region 70 is larger than the diameter D2 of the second region 72, a stop surface 50 is provided for the bushing 34 at the transition between the two regions 70, 72. The opposite stop for the bushing 34 is formed by the end stop 32, which is integrally formed in the second region 72.

On account of the geometry selected, it is thus possible for the bushing 34 to be displaced in an elastically resilient manner by the extent V counter to the action of the helical spring 36. Conversely, this means that in the case of installation, upon insertion of the connector bolt 12.1 with the extension element 30.1 into the central recess 80, an amount of elastically compliant joining play is provided for the head contour 14.1 in the direction of the longitudinal axis of the central recess 80, with the result that the head contour 14.1 can easily be inserted into the groove 42.

In order to produce the connection between the first profile 26 and the second profile 28, the procedure during installation is as follows.

In the first instance, a bore 62 is drilled into the second profile 28 perpendicularly to the central recess 80. A connector sleeve 16 with internal thread 20 is introduced into this bore 62. The connector sleeve 16 here has, perpendicularly to its longitudinal axis, a bolt recess 22 which, with the connector sleeve 16 introduced into the bore 62, is made to coincide with the central recess 80. Once the connector sleeve 16 has been introduced, the connector bolt 12.1 with plugged-on extension element 30.1, bushing 34 and spring element 36 is guided into the central recess 80 and through the bolt recess 22 of the connector sleeve 16. The clamping action of the bushing 34 in conjunction with the spring element 36 provides certain fixing for the connector bolt 12.1, although, at the same time, there is a sufficient amount of installation play available for inserting the head contour 14.1 into the groove 42. Once the head contour 14.1 has been inserted into the groove 42 of the first profile 26, a threaded pin 18 with external thread 24 is screwed into the connector sleeve 16, said threaded pin having a conical tip 64 which, as it is screwed in to an increasing extent, pushes against the conical wall of the recess 66 of the shank 40 of the connector bolt 12.1. The longitudinal axis 78 of the threaded pin 18 is offset by the extent A in relation to the tip of the conical recess 66 of the shank 40. As a result, the end region 64, as conical tip, pushes against the rear abutment surface of the conical recess 66 when the threaded pin 18 is screwed in the connector bolt 12.1 is pressed in the direction of the second profile 28, as a result of which the head contour 14.1 engages with pressing action behind the inner flanks of the groove 42 of the first profile 26. This ensures reliable connection between the second profile 28 and the first profile 26.

Figure 3:
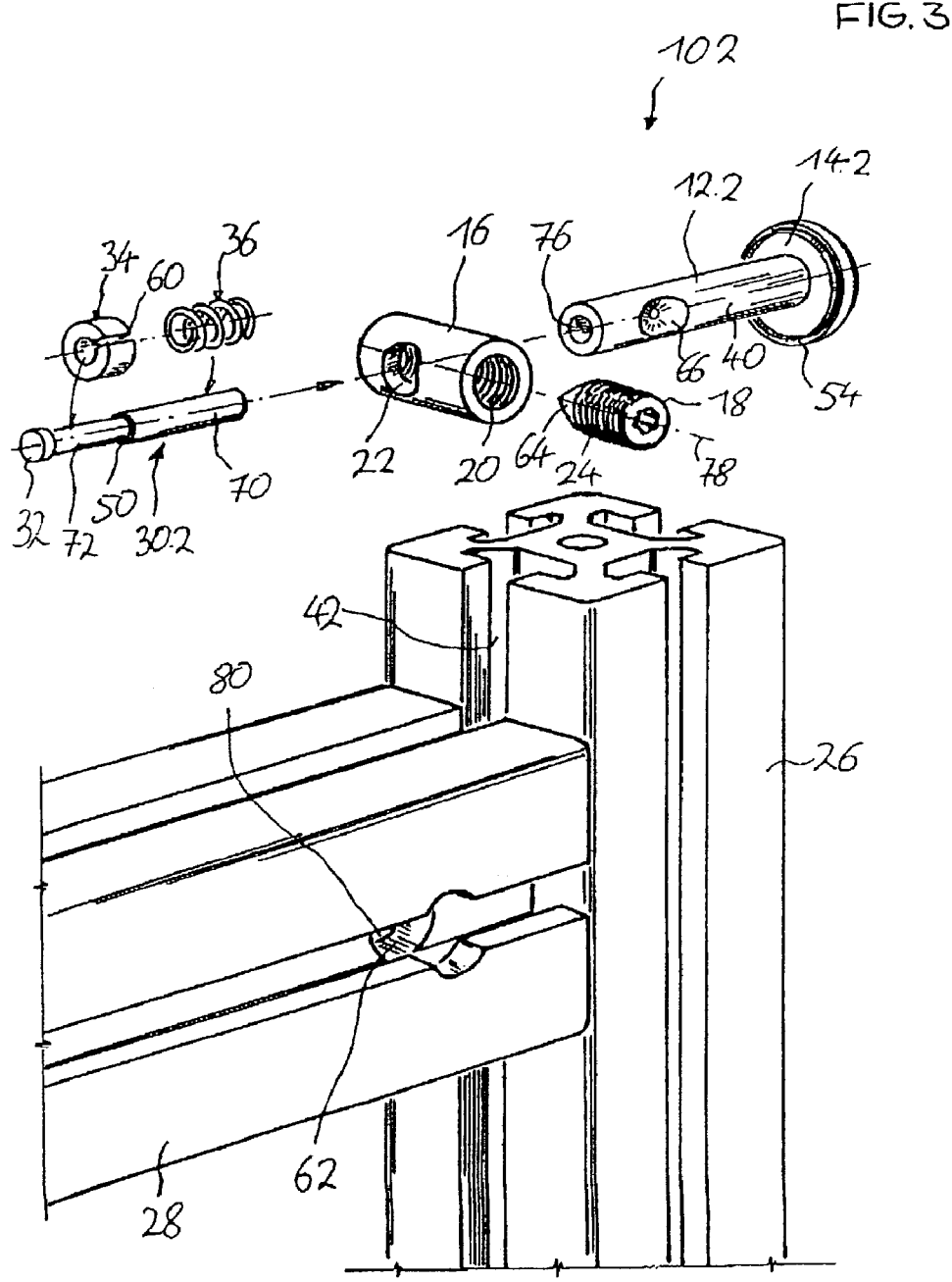
FIG. 3 shows a schematic illustration of the connecting region of two profiles with a second variant of the connector device with extension elements, designed as a drive-in pin, with bushing and spring element in perspective exploded form.

The exemplary embodiment according to FIG. 3 shows a further variant of a connector device 10.2, in the case of which use is made of an extension element 30.2 which is designed a drive-in pin which can be driven into a recess 76 provided on the shank 40 of the connector bolt 12.2. Otherwise, a bushing 34 and a helical spring 36 are likewise provided in the case of the extension element 30.2. As soon as the extension element 30.2 is driven in, this produces a non-releasable connection to the shank 40 of the connector bolt 12.2. Only one part thus has to be introduced into the central recess 80 of the second profile 28 during installation. The ultimately force-transmitting connection is also ensured in this case by the abovedescribed connector sleeve 16 with screwed-in threaded pin 18.

Figure 4:
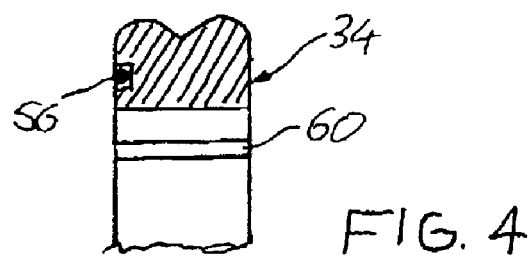
FIG. 4 shows a schematic section, in detail form, through a bushing with double-lipped outer contour and spring ring.

FIG. 4 shows, in detail form, a cross section through an embodiment of the bushing 34 which has a double-lipped circumferential contour and a slit 60 and in the side wall of which a spring ring 74 is positioned. The inner recess of the bushing 34 may be formed, for example, by a sliding flanged bushing.

Figure 5:
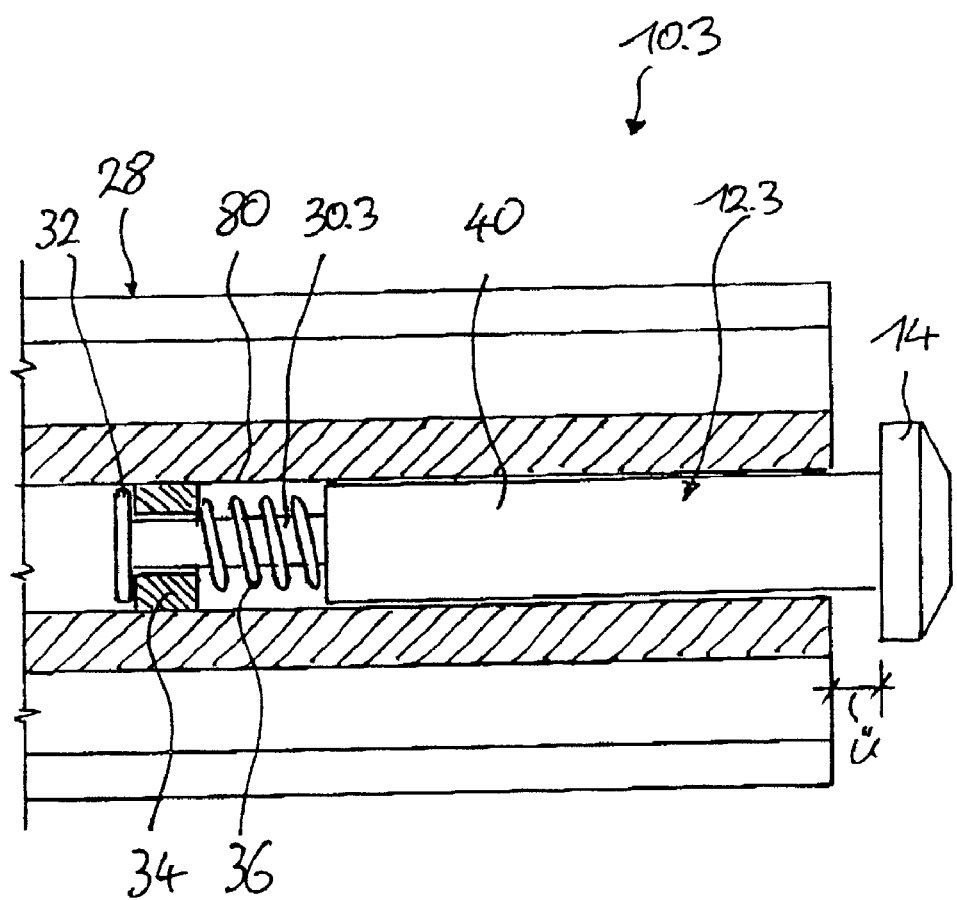
FIG. 5 shows a schematic sectional illustration through a connector device which has been pushed with clamping action into a second profile and has a projecting end contour.

FIG. 5 illustrates, schematically, a sectional illustration through the second profile 28, with connector device 10.3 plugged into the central recess 80. The connector device 10.3 is retained with clamping action in the central recess 80 via the bushing 34. The geometry and/or the length of the extension element 30.3 and of the connector bolt 12.3 here is selected such that in this state, on account of the spring element 36, the end contour 14 of the connector bolt 12.3 projects in relation to the end side 82 of the second profile 28 by an extent U which is dimensioned such that it corresponds to the spacing N from the start of the undercut groove 42 of the first profile 26. This allows straightforward insertion of the end contour 14 into the groove 42. Insertion into smaller groove depths is likewise possible in which the connector device 10.3 is pushed further into the central recess 80 counter to the action of the spring element 36. The fixing of the connector device 10.3 within the central recess via a threaded pin is not illustrated specifically in FIG. 5.

Figure 6:
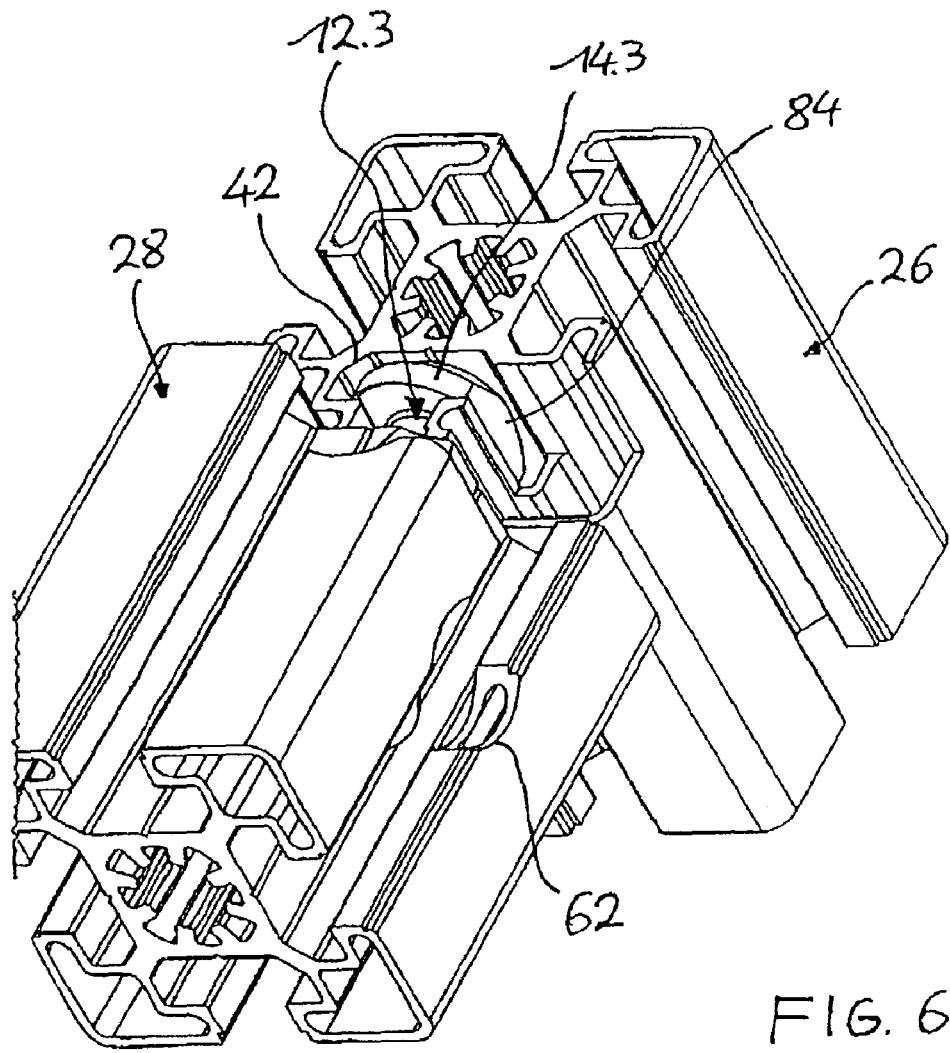
FIG. 6 shows a schematic perspective view, in detail form, of the connecting region of two profiles, with the profiles partly cut away and a connector device with a connector bolt with a flattened end contour.
Figure 7:
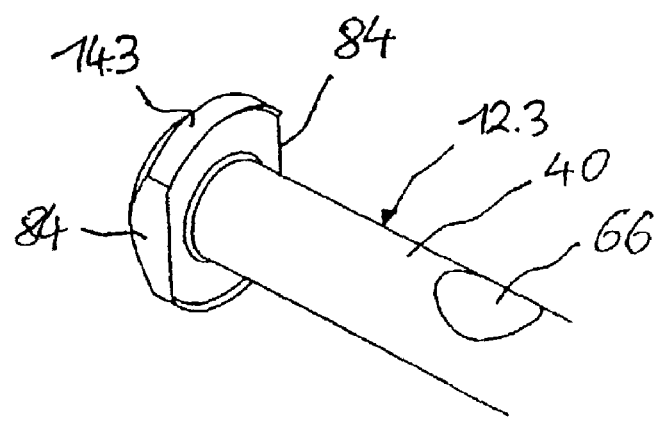
FIG. 7 shows a schematic perspective view, in detail form, of the connecting bolt with flattened end contour.

FIG. 6 shows a schematic perspective view, in detail form, in the connecting region with the profiles partly cut away. In the case of this embodiment, use is made of a connector bolt 12.3 which has an end contour 14.3 which has two mutually opposite flattened regions 34, the flattened regions 34 butting against the longitudinal groove sides when the end contour 14.3 has been introduced into the groove 43 of the first profile 76, this resulting in a rotation-prevention means for the connector device. Such a rotation-prevention means facilitates installation to a considerable extent.

What is claimed is:

1. A connector device for connecting a first profile to an end side of a second profile having a central recess, comprising:

a connector bolt having a shank and an end contour, said shank of the connector bolt being arrangeable and fixable in the central recess of the second profile, said end contour being engageable behind a recess in said first profile;

an extension element adjoining the connector bolt shank at an end opposite the end contour, the extension element including a first region, a second region, and an end stop, wherein the first region of the extension element has a first diameter and the second region of the extension element has a second diameter, and the first diameter of the first region of the extension element is larger than the second diameter of the second region of the extension element;

a bushing slidingly engaging the second region of the extension element, said bushing being fixable via a clamping action to the central recess of the second profile;

an elastic element provided between the bushing and the connector bolt, said elastic element acting one of directly and indirectly on the bushing and the connector bolt;

wherein the connector bolt is adjoined at an end opposite from the end contour to an extension element that comprises a first region and a second region;

a diameter of the shank of the connector bolt corresponds to the diameter of the central recess of the second profile, and once the bushing has been pushed into the central recess of the second profile and engaged the recess due to the clamping action, the end contour projects under the influence of said elastic element beyond the end side of the second profile by an extent which corresponds to an insertion-groove depth of the first profile.

2. The connector device as claimed in claim 1, wherein the elastic element is a spring element.

3. The connector device as claimed in claim 1, wherein:
the extension element is integrally connected to the connector bolt; and
the extension element, the connector bolt, the bushing, and the elastic element form a single unit.

4. The connector device as claimed in claim 1, wherein the extension element is a drive-in element.

5. The connector device as claimed in claim 4, wherein the drive-in element is at least one of a notched nail, drive-in pin and a knurled pin.

6. The connector device as claimed in claim 1, wherein the extension element is connected in a releasable manner to the connector bolt.

7. The connector device as claimed in claim 6, wherein, the extension element has a latching element and the connector bolt has a corresponding mating latching element so as to releasably connect the extension element onto the connector bolt.

8. The connector device as claimed in claim 1, wherein the extension element is a plastic injection molding.

9. The connector device as claimed in claim 1, wherein the bushing has a radial slit extending axially.

10. The connector device as claimed in claim 1, wherein an outer contour of the bushing, which butts against the wall of the central recess of the second profile, has a double lipped configuration.

11. The connector device as claimed in claim 1, wherein an outer contour of the bushing, which butts against a wall of the central recess of the second profile, has a semicircular configuration with a convex curvature.

12. The connector device as claimed in claim 1, wherein the bushing is a sliding flanged bushing.

13. The connector device as claimed in claim 1, wherein a shank of the extension element has a first stop for the bushing.

14. The connector device as claimed in claim 9, wherein a spring ring is positioned in a wall of the bushing.

15. The connector device as claimed in claim 13, wherein the first stop for the bushing is provided at a transition between the first and second region of the extension elements and a second stop for the bushing is provided by the end stop of the extension element.

16. The connector device as claimed in claim 1, wherein a head contour of the connector bolt is formed as a head having a circular cross section, an encircling end border of the head that is oriented toward the shank has an annular cutting edge.

17. The connector device as claimed in claim 1 further comprising:

a connector sleeve having an internal thread and a bolt recess for permitting insertion of the connector device through the bolt recess when the connector sleeve has been inserted into a bore that is oriented perpendicularly to a longitudinal direction of the second profile; and a threaded pin having an external thread that corresponds to the internal thread of the connector sleeve, said threaded pin being screwable into the internal thread of said connector sleeve;

wherein, at least in certain regions, the threaded pin is screwable in a form-fitting manner by way of its end region into a contour provided on the shank of the connector bolt so as to clamp the end contour of the connector bolt in the particular groove of the first profile.

18. The connector device as claimed in claim 1, wherein the end contour of the connector bolt has at least one planar flattened region which, with the end contour introduced into the groove of the first profile, abutts a longitudinal groove wall to thereby form a device which prevents unwanted rotations.

19. The connector device as claimed in claim 18, wherein the end contour has two mutually opposite flattened planar regions and a spacing between the planar regions corresponds to an undercut groove width.

20. The connector device as claimed in claim 1, wherein a first end of the elastic element is supported by the connector bolt and a second end of the elastic element is supported by the bushing.

21. The connector device as claimed in claim 1, wherein the spring element is a helical spring.

* * * * *